US008573572B2

(12) United States Patent
Bowen et al.

(10) Patent No.: US 8,573,572 B2
(45) Date of Patent: Nov. 5, 2013

(54) USER-SELECTABLE FORCE CONVERSION APPARATUS AND METHOD

(75) Inventors: Landen A. Bowen, Provo, UT (US); Larry L. Howell, Orem, UT (US); Spencer P. Magleby, Provo, UT (US); Brian M. Olsen, Los Alamos, NM (US); Terri C. Bateman, American Fork, UT (US); Devin D. LeBaron, Highland, UT (US); Avinesh Ojha, Urbana, IL (US)

(73) Assignee: Brigham Young University, Provo, UT (US)

( * ) Notice: Subject to any disclaimer, the term of this patent is extended or adjusted under 35 U.S.C. 154(b) by 227 days.

(21) Appl. No.: 13/251,227

(22) Filed: Oct. 1, 2011

(65) Prior Publication Data

US 2012/0080830 A1 Apr. 5, 2012

Related U.S. Application Data

(60) Provisional application No. 61/404,336, filed on Oct. 1, 2010.

(51) Int. Cl.
*A63B 21/00* (2006.01)

(52) U.S. Cl.
USPC ............ 267/158; 482/142; 482/130; 267/229

(58) Field of Classification Search
USPC ......... 267/37.3, 158, 160, 229; 482/110, 130, 482/142
See application file for complete search history.

(56) References Cited

U.S. PATENT DOCUMENTS 7,014,599 B2 * 3/2006 Ashley ......................... 482/110
7,250,022 B2 * 7/2007 Dalebout et al. .............. 482/142

* cited by examiner

*Primary Examiner* — Christopher Schwartz
(74) *Attorney, Agent, or Firm* — Utah Valley Patent; Steve McDaniel

(57) ABSTRACT

A user-selectable force conversion apparatus includes a first and a second connecting member that are pivotally connected to each other between a sliding member and a fixed member. The apparatus also includes a leaf spring holder for removably retaining one or more leaf springs and loading the second connecting member with a substantially linear force response of the leaf springs. A user may change the combination of leaf springs and/or vary a length ratio for the first and second connecting members and thereby change the force response of the apparatus. Movement of the sliding member by the mechanical input may convert the substantially linear force response of the leaf springs to a user-selected force response for the mechanical input. A corresponding method is also disclosed.

18 Claims, 6 Drawing Sheets

USER-SELECTABLE FORCE CONVERSION APPARATUS AND METHOD

RELATED APPLICATIONS

This application claims priority to U.S. Provisional Patent Application No. 61/404,336 entitled "Constant Force Apparatus with Discrete Force Adjustment" and filed on 1 Oct. 2010 for Larry L. Howell, Spencer P. Magleby, Brian Olsen, Terri Bateman, Landen Bowen, Devin Lebaron, and Avinesh Ojha. The aforementioned application is incorporated herein by reference in its entirety.

BACKGROUND OF THE INVENTION

1. Field of the Invention

This invention relates generally to Compliant Mechanisms (CMs) and more particularly relates to apparatii and methods for providing a user-selectable force response.

2. Description of the Related Art

Providing a user-selectable load is a desirable characteristic in exercise equipment and other devices such as mechanical test equipment. Typically, weights corresponding to a maximum load must be retained within such equipment and selectably connected to a mechanical input. Considerable mass is typically required which increases the manufacturing cost, shipping cost, and size of such equipment. Furthermore, a variety of force responses such as an increasing or decreasing force response are difficult to attain with such equipment. What is needed are means and methods to provide a user-selectable load within exercise equipment and other devices without requiring dead weights.

SUMMARY OF THE INVENTION

Compliant mechanisms are mechanical devices that transform energy or motion through the deflection of flexible members (See "*Compliant Mechanisms*" published in 2001 by Wiley-Interscience and authored by Larry L. Howell, a co-inventor of the present invention). The flexure forces available through such members may be much greater than the weight of the members. The present invention leverages compliant mechanisms in a particular manner to provide a user-selectable force conversion apparatus and method that overcome many of the shortcomings in the prior art.

As detailed below, an apparatus for providing a user-selectable force response includes a sliding member coupled to a mechanical input, the sliding member configured to move along a sliding path, a first connecting member pivotally connected to the sliding member and a second connecting member pivotally connected to the first connecting member and an anchor member. The apparatus also includes a leaf spring holder for removably retaining one or more leaf springs substantially parallel to the second connecting member and for loading the second connecting member with a substantially linear force response of the leaf springs. A corresponding method is also disclosed.

Similar to changing weights on a barbell or weight machine, changing the combination of leaf springs may change the force response of the apparatus. The apparatus may also include a length ratio selector that enables a user to vary a length ratio for the first and second connecting members and thereby select a user-selected force response for the mechanical input from a variety of force responses corresponding to the various length ratios. In one embodiment, the force responses include a constant force response, one or more increasing force responses and one or more decreasing force responses. Upon selection of a force response via the selected combination of leaf springs and/or the selected length ratio, movement of the sliding member by the mechanical input may convert the substantially linear force response of the leaf springs to a user-selected force response for the mechanical input.

The present invention provides a variety of advantages. It should be noted that references to features, advantages, or similar language within this specification does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The aforementioned features and advantages of the present invention will become more fully apparent from the following description and appended claims, or may be learned by the practice of the invention as set forth hereinafter.

BRIEF DESCRIPTION OF THE DRAWINGS

To enable the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1A:
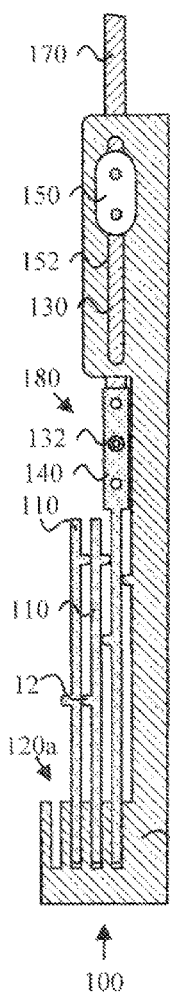
FIGS. 1a and 1b are side view illustrations depicting one embodiment of a force response conversion apparatus of the present invention.
Figure 1B:
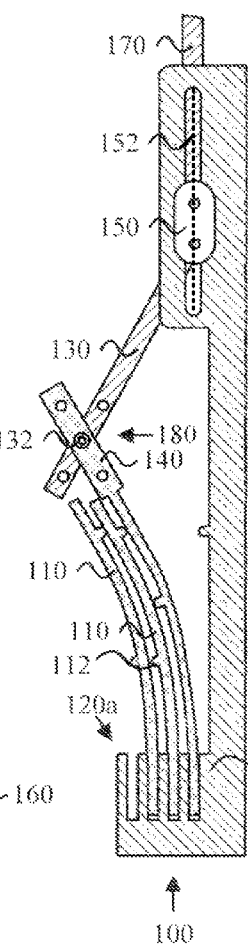
Figure 2A:
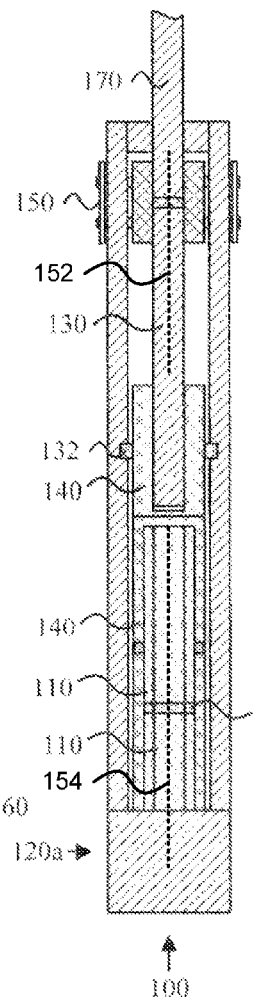
FIGS. 2a and 2b are front view illustrations of the force response conversion apparatus depicted in FIGS. 1a and 1b.
Figure 2B:
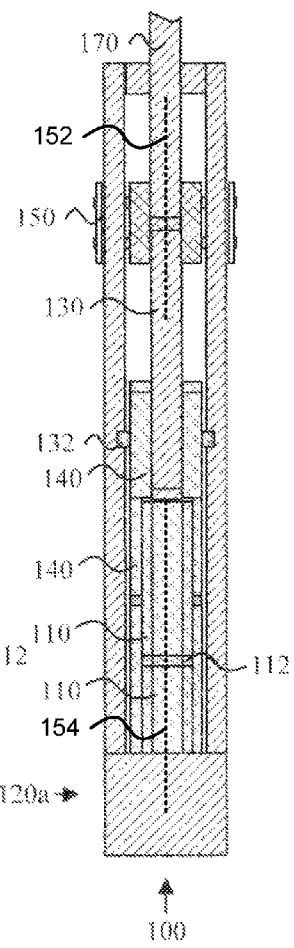

FIGS. 1a and 1b are side views and FIGS. 2a and 2b are front views of a force response conversion apparatus 100 of the present invention. FIGS. 1a and 2a depict the apparatus in a loading state while FIGS. 1b and 2b depict the apparatus in a working state. As depicted, the apparatus 100 includes one or more removable leaf springs 110, a leaf spring holder 120, a first connecting member 130, a second connecting member 140, a sliding member 150, an anchor member 160, a mechanical input 170 and a length ratio selector 180. The apparatus 100 provides a user-selectable force response to the mechanical input 170.

The leaf springs 110 may be inserted or removed to adjust the amount of force required to move the mechanical input. The leaf springs 110 may be separated by spacers 112 that reduce friction between the springs. The leaf springs may have a substantially linear force response that is converted to a user-selected force response via the apparatus 100. The leaf spring holder 120 may be attached to the anchor member 160 and hold the base of the inserted leaf springs 110 in place during operation and thereby load the second connecting member with the substantially linear force response of the inserted leaf springs.

The depicted first connecting member 130 is pivotally coupled to the second connecting member 140 and the sliding member 150. The sliding member 150 may be configured to move along a sliding path 152. Movement of the mechanical input 170 and the sliding member 150 along the sliding path 152 toward the anchor member 160 causes the first and second connecting members to pivot relative to each other and raise a pivot point 132 which in turn causes the inserted leaf springs 110 to flex and provide a substantially linear load to the second connecting member 140.

The sliding path 152 may be substantially co-planar with the anchor member 160 and a longitudinal midline 154 of the inserted leaf springs. In the depicted embodiment, the anchor member 160 and the sliding path 152 are substantially co-linear. One of skill in the art will appreciate that the anchor member 160 may be offset from the sliding path 152, while remaining co-planar with the longitudinal midline 154, in order to obtain particular force responses for the apparatus 100.

The second connecting member 140 is pivotally coupled to the first connecting member 130 and is also connected to an anchor member 160 opposite the first connecting member 130. In the depicted embodiment, the second connecting member 140 is a base leaf spring that is similar in construction to the leaf springs 110 and has a substantially linear force response. The first and second connecting members may be rigid or flexible members. In the depicted embodiment, the first connecting member 130 is a rigid member and the second connecting member 140 is a flexible member. The first and second connecting members may have a length ratio (e.g. length of the first connecting member divided by the length of the second connecting member) that corresponds to a desired force response for the mechanical input.

In response to moving the mechanical input and raising the pivot point 132, the first and second connecting members may convert the substantially linear force response of the leaf springs to the desired (i.e. user-selected) force response for the mechanical input. The desired force response may be a constant force response, an increasing force response, a decreasing force response or any force response attainable from the described apparatus. In the depicted embodiment, a length ratio selector 180 may be used to change the desired force response. Furthermore, the leaf springs 110 may be used to adjust the average or peak force level for the desired force response.

Figure 3A:
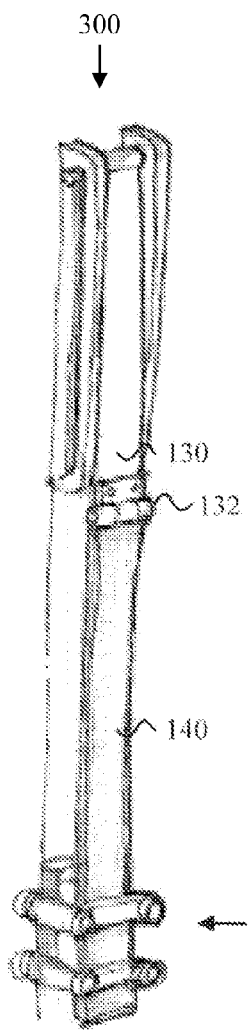
FIGS. 3a, 3b, and 3c are perspective view illustrations depicting another embodiment of a force response conversion apparatus of the present invention.
Figure 3B:
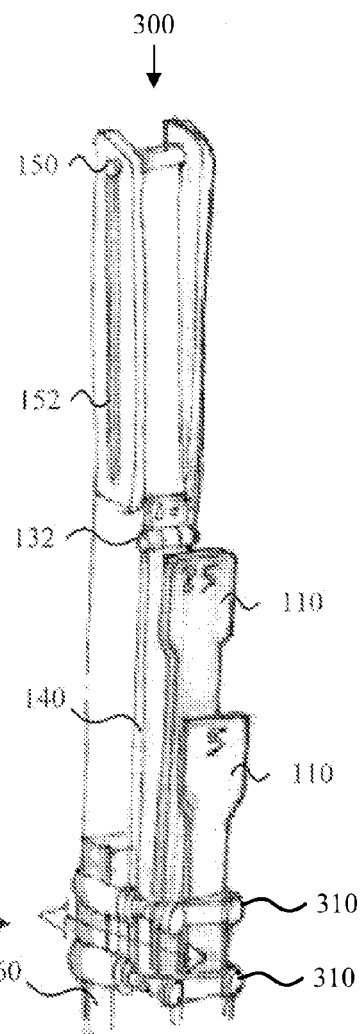
Figure 3C:
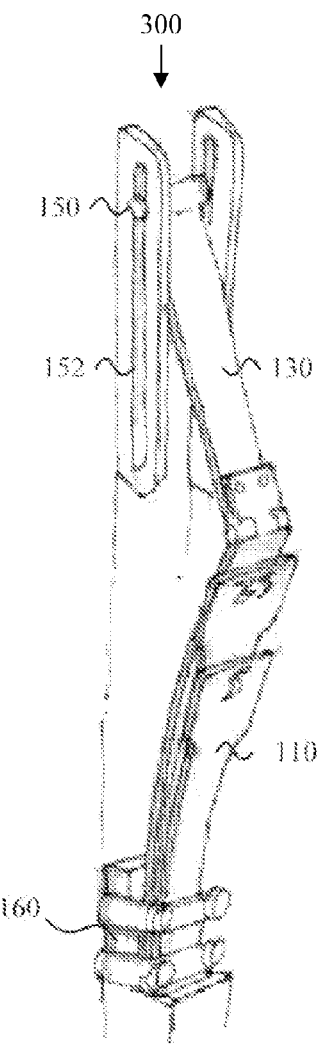

FIGS. 3a, 3b, and 3c are perspective view illustrations depicting another embodiment of a force response conversion apparatus 300 of the present invention. As depicted, the apparatus 300 includes many of the same elements as the apparatus 100 including the removable leaf springs 110, the leaf spring holder 120, the first connecting member 130, the second connecting member 140, the sliding member 150, and the anchor member 160. The apparatus 300 also provides a user-selectable force response to a mechanical input (not shown).

The leaf spring holder 120a shown in FIGS. 1 and 2 differs from the leaf spring holder 120b shown in the FIG. 3. The leaf spring holder 120a comprises a set of parallel slots which expedites insertion and removal of leaf springs while the apparatus 100 is in a loading state. In contrast, the leaf spring holder 120b is a clamp that is adjusted by a user via one or more bolts 310 in order to facilitate removal and retention of the leaf springs 110 from/within the apparatus 300. In either embodiment, the leaf springs 110 and the holder 120 may be keyed (see FIG. 8) to facilitate alignment and retention of the leaf springs 110 within the holder 120.

Figure 4:
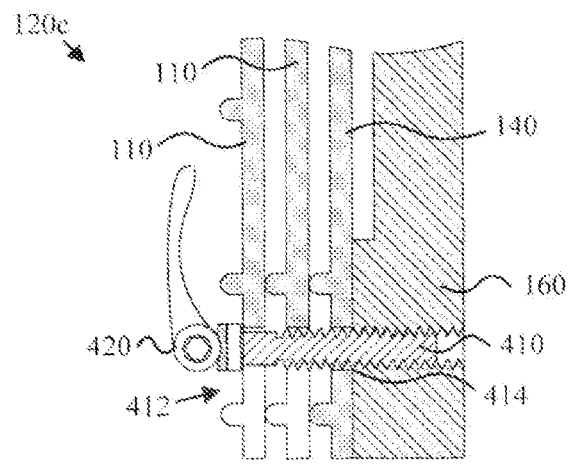
FIG. 4 is a cross-sectional side view depicting an alternative embodiment of a leaf spring holder of the present invention.

FIG. 4 is a cross-sectional side view depicting another alternative embodiment of the leaf spring holder 120 namely a leaf spring holder 120c. The depicted leaf spring holder 120c comprises a bolt 410 that passes through keyholes 412 within the base of the leaf springs 110 and through an anchor hole 414 in the second connecting member 140. The bolt 410 attaches and secures the leaf springs 110 to the anchor member 160. In the depicted embodiment, the bolt 410 has a quick release head 420 that facilitates removal and insertion of the leaf springs 110.

Figure 5:
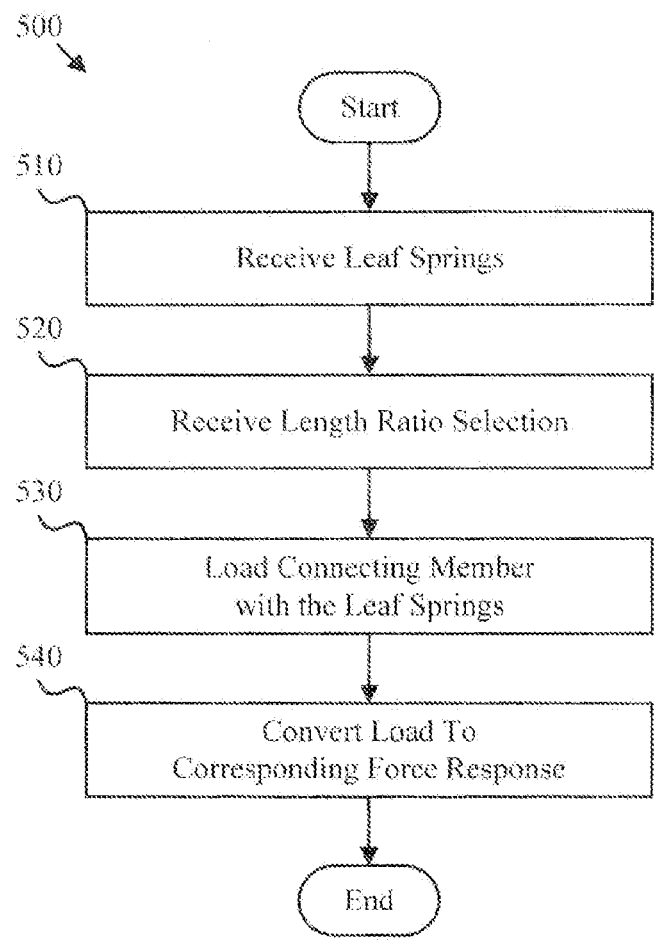
FIG. 5 is a flowchart diagram of one embodiment of a force response conversion method of the present invention.

FIG. 5 is a flowchart diagram of one embodiment of a force response conversion method 500 of the present invention. As depicted the force response conversion method 500 includes receiving 510 one or more leaf springs, receiving 520 a length ratio selection, loading 530 a connecting member with the leaf springs, and converting 540 the load on the connection member to a corresponding force response. The force response conversion method may be conducted in conjunction with the force conversion apparatus 100, the force conversion apparatus 300 or the like.

Receiving 510 one or more leaf springs may include receiving leaf springs having a substantially linear force response. The leaf springs may be received and retained in a leaf spring holder such as the leaf spring holder 120 while the apparatus is in a loading state. Receiving 520 a length ratio selection may include enabling a user to set or vary a length ratio for the first and second connecting members from a set of available length ratios. The available length ratios may correspond to various force responses such as a constant force response, an increasing force response and a decreasing force response.

Loading 530 a connecting member with the leaf springs may include holding the leaf springs against the connecting member during movement of the connecting member. Converting 540 the load on the connection member may include using the mechanical leverage of the first and second connecting members to convert the substantially linear force response of the leaf springs to a desired force response for a mechanical input. The desired force response may correspond to the load on the connecting member as well as the length ratio selection.

Figure 6:
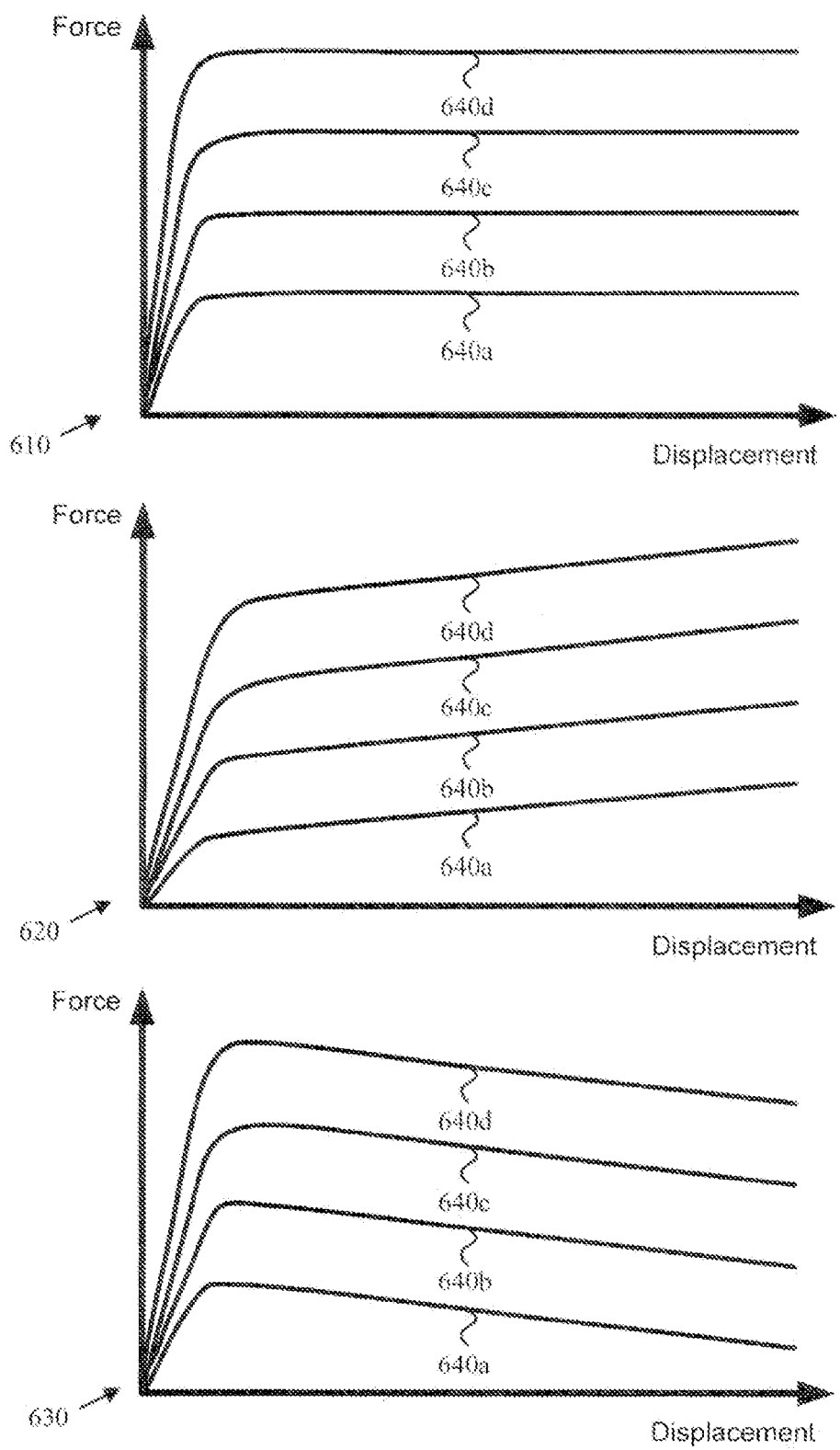
FIG. 6 is a set of graphs depicting idealized force response curves for the present invention.

FIG. 6 is a set of graphs depicting idealized force response curves for the present invention. The depicted graphs include a constant force graph 610, an increasing force graph 620, and a decreasing force graph 630. One of skill in the art will appreciate that the idealized force response curves represent a desired force response that is not attained within an actual system but may be approached within certain engineering tolerances that vary according to the particular design and materials used.

Each force graph has a set of response curves 640a-d corresponding to a particular leaf spring load. Thus the force response of the system may be adjusted via the leaf springs 110. Furthermore, the graphs 610, 620, 630, or the like may correspond to particular length ratios for the connecting members. In certain embodiments, the response curves 640 corresponding to a particular graph are activated by selection of a particular length ratio for the connecting members 130 and 140.

Figure 7:
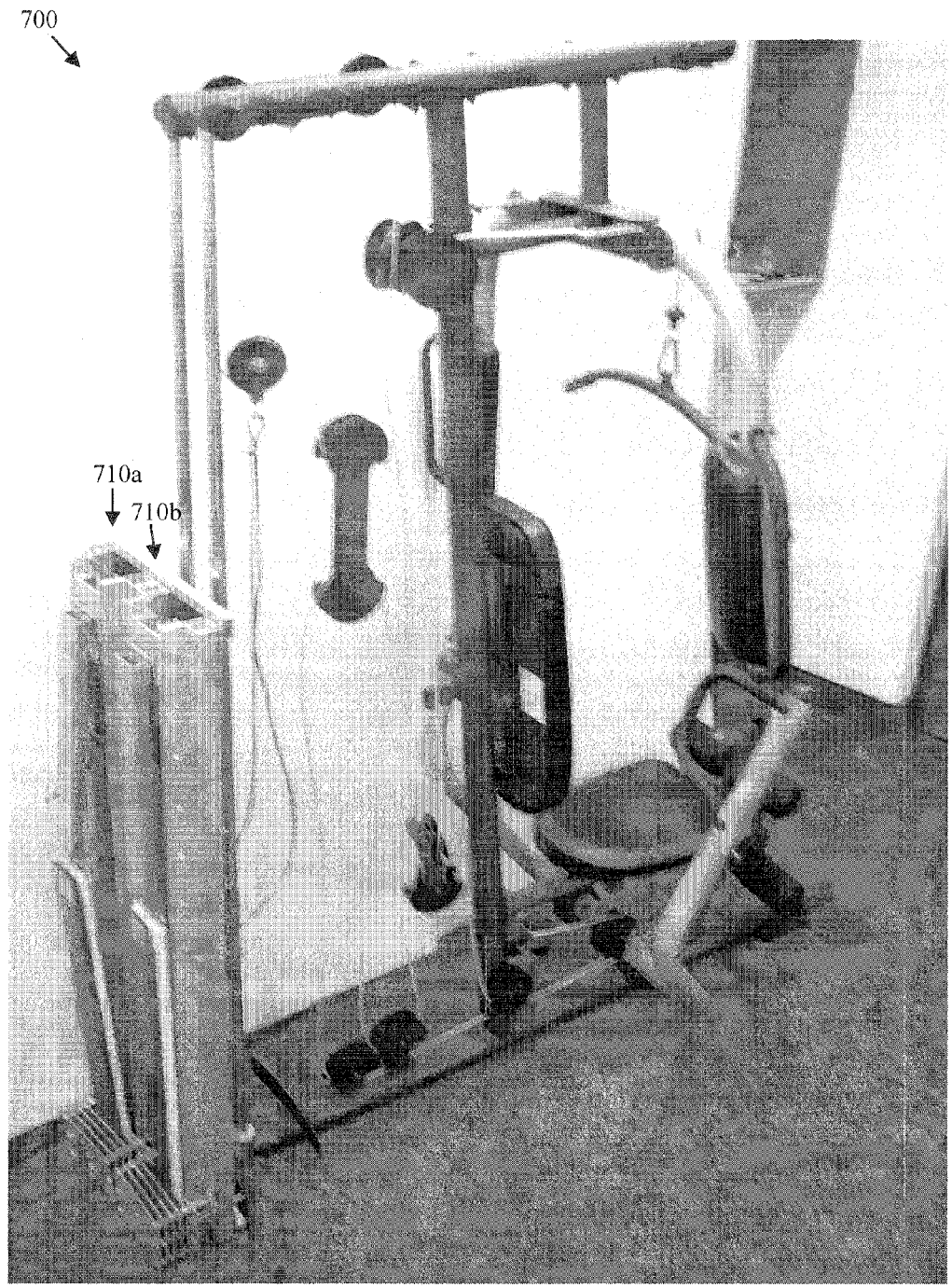
FIG. 7 is a perspective view illustration depicting one embodiment of the force response conversion apparatus of the present invention integrated into an exercise machine.

FIG. 7 is a perspective view illustration depicting the integration of a particular force response conversion apparatus 710 of the present invention into an exercise machine 700. In the depicted embodiment, two force conversion devices 710 are coupled in parallel in order to provide a greater range of responses.

Figure 8:
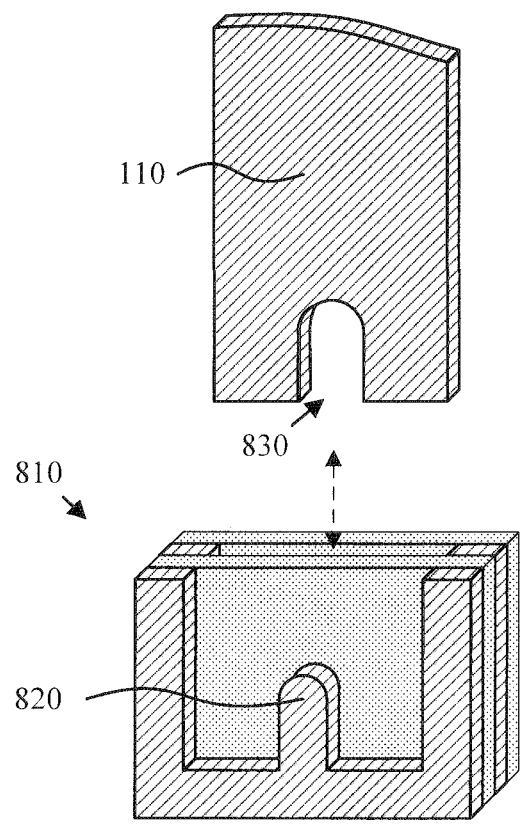
FIG. 8 is a perspective view illustration depicting one embodiment a keyed leaf spring slot and corresponding leaf spring.

FIG. 8 is a perspective view illustration depicting one embodiment of a keyed leaf spring slot 810 with a key 820. The keyed leaf spring slot 810 is configured to receive a leaf spring 110 with a keyhole 830. Multiple leaf spring slots may be combined into a leaf spring holder 120 such as those depicted in previous figures.

The present invention provides user-selectable force response devices and methods. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for providing a user-selectable force response, the apparatus comprising:
a sliding member coupled to a mechanical input, the sliding member configured to move along a sliding path;
a first connecting member pivotally connected to the sliding member;
a second connecting member pivotally connected to the first connecting member;
the second connecting member further connected to an anchor member opposite the first connecting member;
a leaf spring holder connected to the anchor member and configured to removably retain one or more leaf springs with a substantially linear force response substantially parallel to the second connecting member and thereby load the second connecting member with the substantially linear force response of the leaf springs;
wherein the first and second connecting members have a length ratio selected to convert the substantially linear force response of the leaf springs to a desired force response for the mechanical input.

2. The apparatus of claim 1, further comprising a length ratio selector that enables a user to vary a length ratio for the first and second connecting members and thereby select a user-selected force response for the mechanical input from a plurality of force responses.

3. The apparatus of claim 2, wherein the plurality of force responses include a substantially constant force response, an increasing force response, and a decreasing force response.

4. The apparatus of claim 1, wherein the first connecting member is rigid and the second connecting member is flexible.

5. The apparatus of claim 4, wherein second connecting member is a base leaf spring.

6. The apparatus of claim 1, wherein the leaf spring holder comprises a plurality of parallel slots.

7. The apparatus of claim 1, wherein the leaf spring holder comprises a clamp or a bolt.

8. The apparatus of claim 1, further comprising the plurality of leaf springs.

9. The apparatus of claim 8, wherein the leaf spring holder and the plurality of leaf springs are keyed to facilitate alignment of an inserted leaf spring with the second connecting member.

10. The apparatus of claim 8, wherein each leaf spring of the plurality of leaf springs corresponds to a particular constant force.

11. The apparatus of claim 8, wherein the sliding path is substantially co-planar with a longitudinal mid-line of the plurality of leaf springs.

12. The apparatus of claim 1, wherein inserting multiple leaf springs into the holder provides a substantially constant cumulative force response that corresponds to a sum of individual force responses for the leaf springs.

13. An apparatus for providing a user-selectable force response, the apparatus comprising:
a sliding member coupled to a mechanical input, the sliding member configured to move along a sliding path;
a first connecting member pivotally connected to the sliding member;
a second connecting member pivotally connected to the first connecting member and a fixed member;
a length ratio selector that enables a user to vary a length ratio for the first and second connecting members and thereby select a user-selected force response for the mechanical input;
a leaf spring holder for retaining one or more leaf springs with a substantially linear force response substantially parallel to the second connecting member and thereby load the second connecting member with the substantially linear force response of the leaf springs; and
wherein the first and second connecting members convert the substantially linear force response of the leaf springs to the user-selected force response for the mechanical input.

14. The apparatus of claim 13, wherein the user-selected force response is selected from a constant force response, an increasing force response, and a decreasing force response.

15. A method for providing a user-selectable force response, the method comprising:
receiving one or more leaf springs having a substantially linear force response;
receiving a mechanical input with a slider, the slider pivotally connected to a first connecting member, the first connecting member pivotally connected to a second connecting member, the second connecting member further connected to an anchor member opposite the first connecting member;
loading the second connecting member with the substantially linear force response of the leaf springs; and converting the substantially linear force response of the leaf springs to a corresponding force response for the mechanical input via the first and second connecting members.

16. The method of claim 15, wherein the corresponding force response is selected from the group consisting of a constant force response, an increasing force response, and a decreasing force response.

17. The method of claim 15, further comprising receiving a selection for a length ratio of the first and second connecting members, the length ratio selected from a plurality of available length ratios.

18. The method of claim 17, wherein the length ratio corresponds to a selected force response, the selected force response selected from the group consisting of a constant force response, an increasing force response, and a decreasing force response.

* * * * *